United States Patent
Katrinis et al.

(10) Patent No.: US 10,423,563 B2
(45) Date of Patent: Sep. 24, 2019

(54) MEMORY ACCESS BROKER SYSTEM WITH APPLICATION-CONTROLLED EARLY WRITE ACKNOWLEDGMENT SUPPORT AND IDENTIFICATION OF FAILED EARLY WRITE ACKNOWLEDGMENT REQUESTS TO GUARANTEE IN-ORDER EXECUTION OF MEMORY REQUESTS OF APPLICATIONS

(71) Applicant: INTERNATIONAL BUSINESS MACHINES CORPORATION, Armonk, NY (US)

(72) Inventors: Konstantinos Katrinis, Dublin (IE); Andrea Reale, Dublin (IE); Dimitrios Syrivelis, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/783,069

(22) Filed: Oct. 13, 2017

(65) Prior Publication Data

US 2019/0114284 A1   Apr. 18, 2019

(51) Int. Cl.
G06F 13/42 (2006.01)
G06F 12/0817 (2016.01)
G06F 13/18 (2006.01)
G06F 13/40 (2006.01)

(52) U.S. Cl.
CPC ...... *G06F 13/4239* (2013.01); *G06F 12/0828* (2013.01); *G06F 13/18* (2013.01); *G06F 13/4059* (2013.01)

(58) Field of Classification Search
CPC combination set(s) only.
See application file for complete search history.

(56) References Cited

U.S. PATENT DOCUMENTS

| | | | |
|---|---|---|---|
| 5,537,555 A | 7/1996 | Landry et al. | |
| 6,279,065 B1 | 8/2001 | Chin et al. | |
| 7,111,153 B2 * | 9/2006 | Kuttanna | G06F 9/383 710/36 |
| 2015/0026411 A1 | 1/2015 | Lippert | |
| 2015/0261677 A1 | 9/2015 | Malewicki | |
| 2016/0188209 A1 * | 6/2016 | Hansson | G06F 13/16 711/118 |
| 2017/0149843 A1 | 5/2017 | Amulothu | |
| 2017/0235688 A1 | 8/2017 | Tanaka | |

OTHER PUBLICATIONS

Anonymous, "Method for Efficient Access in Hybrid Memory Systems," An IP.com Prior Art Database Technical Disclosure, IP.com No. IPCOM000243872D, Oct. 23, 2015 (5 pages).
IBM, "Using Coherence Checking in a Multi-Ported Memory Controller to Insure Data Integrity," An IP.com Prior Art Database Technical Disclosure, IP.com No. IPCOM000019262D, Sep. 8, 2003 (3 pages).

* cited by examiner

*Primary Examiner* — Raymond N Phan
(74) *Attorney, Agent, or Firm* — Griffiths & Seaton PLLC

(57) ABSTRACT

Embodiments for a memory access broker system with application-controlled early write acknowledgment support. A memory access broker may be selectively enabled to facilitate early write acknowledgement (EWACK) operations and notification of failed EWACK write requests to one or more issuing applications such that the failed EWACK write requests are logged by the memory access broker for inspection by the one or more issuing applications.

17 Claims, 10 Drawing Sheets

MEMORY ACCESS BROKER SYSTEM WITH APPLICATION-CONTROLLED EARLY WRITE ACKNOWLEDGMENT SUPPORT AND IDENTIFICATION OF FAILED EARLY WRITE ACKNOWLEDGMENT REQUESTS TO GUARANTEE IN-ORDER EXECUTION OF MEMORY REQUESTS OF APPLICATIONS

BACKGROUND OF THE INVENTION

Field of the Invention

The present invention relates in general to computing systems, and more particularly to, various embodiments for using a memory access broker system with application-controlled early write acknowledgment support to interface a computing processor to any memory technology.

Description of the Related Art

In today's interconnected and complex society, computers and computer-driven equipment are more commonplace. Processing devices, with the advent and further miniaturization of integrated circuits, have made it possible to be integrated into a wide variety of devices. Many computing systems include computer memory which may be accessed using memory bus protocols. Several memory bus standards have been developed to support different processor architectures, for example, QuickPath Interconnect (Intel®), Advanced Microcontroller Bus Architecture (ARM®), Coherent Accelerator Processor Interface (IBM®), and HyperTransport® (AMD®), etc.

A challenging requirement for any memory bus architecture is to guarantee delivery of memory access requests. To achieve this, memory bus architectures implement explicit acknowledgement schemes, where an acknowledgement is sent back to the request issuing entity (e.g., a processor core) for each request that completes successfully. Since read access requests pull data from the memory, the correct data reception acts as the acknowledgement in this case. On the other hand, write data requests push data to memory and need to explicitly wait for an acknowledgement to come back, after the data has been successfully written. For any computing system to maintain program execution integrity, requests that are issued by the same issuing entity have to be served in-order. Therefore, applications that issue many consecutive write requests (e.g., when large memory copies are performed) experience a performance impact that is directly related to write request explicit acknowledgement. Since the write acknowledgement does not involve transfer of data, a need exists to improve execution performance such as, for example, improving applications exhibiting write-intensive memory access patterns.

SUMMARY OF THE INVENTION

Various embodiments for using a memory access broker system with application-controlled early write acknowledgment support are provided. In one embodiment, by way of example only, a method for selectively enabling a memory access broker system with application-controlled early write acknowledgment support, by a processor, is provided. A memory access broker may be selectively enabled to facilitate early write acknowledgement (EWACK) operations—as opposed to normal/current write acknowledgement (WACK) operations—and notification of failed EWACK write requests to one or more issuing applications such that the failed EWACK write requests are logged by the memory access broker for inspection by the one or more issuing applications.

In one aspect, various embodiments are provided to guarantee data integrity and deterministic program execution while significantly improving application performance for memory write accesses. In one aspect, a write access request broker device facilitates fast EWACK and notification of failed write requests to issuing applications. The memory write access request broker device can be selectively enabled at runtime to serve applications that have the required support to safely exploit the memory write access request broker device without affecting the execution integrity of concurrently active legacy applications. One or more solutions are provided for an operating system (OS) and an application programming interface (API) for application level control, write access request integrity checks, support, and for overcoming barriers for application-level handling of failed writes.

As another added feature and advantage over the current state of the art, the memory access broker may be selectively enabled or disabled at runtime of a write request, wherein the memory access broker serves as an intermediary broker between a memory bus master and memory controller slave. One or more solutions are provided for logging the failed write requests in one or more EWACK registers associated with the memory access broker. One or more solutions are provided for receiving, by the memory access broker, a write request from a memory bus master, or issuing, by the memory access broker, to a memory controller slave the write request received from the memory bus master.

In an additional aspect, one or more solutions are provided for receiving, by the memory access broker, a WACK response from the memory controller; or issuing, by the memory access broker, to the memory bus master the WACK response received from the memory controller. The memory access broker may also generate a write request identifier (ID) for each EWACK write request and place in the generated write request ID in a queue.

Said differently, the memory controller issues the WACK (write acknowledgement requests). The EWACK may be issued by the memory access broker only to a computing system master. It should be noted that "EWACK" may be called early because in EWACK mode the memory access broker is not waiting for the memory controller to send the normal WACK back.

As another added feature and advantage over the current state of the art, a WACK response received from a memory controller is compared, by the memory access broker, with the generated write request ID retrieved from the queue. One or more solutions are provided for indicating a failed EWACK write request in one or more EWACK registers by the memory access broker upon determining the generated write request ID retrieved from the queue does not match the WACK response received from the memory controller, and identifying the failed EWACK write request logged in the one or more EWACK registers by the one or more issuing applications. One or more solutions are also provided for requiring the one or more issuing applications to reissue each write request upon identifying the failed EWACK write request indicated in the one or more EWACK registers.

BRIEF DESCRIPTION OF THE DRAWINGS

For the advantages of the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
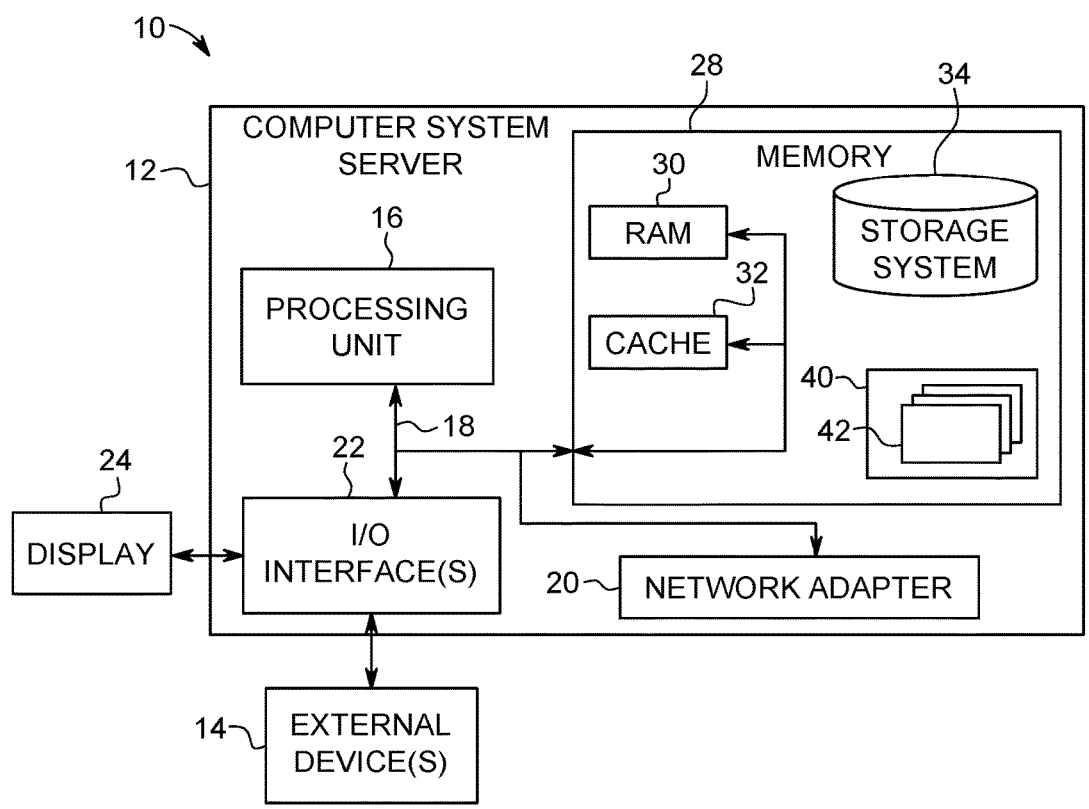
FIG. 1 is a block diagram depicting an exemplary cloud computing node according to an embodiment of the present invention.

Memory write accesses may be issued by central processor units (CPU) or direct memory access (DMA) engines towards external memory device controllers such as, for example, dynamic random-access memory controllers ("DDR"), hybrid memory controllers ("HMC"), or disaggregated memory systems. When a write access to memory is initiated, the CPU or direct memory access DMA data path execution may stall until a write access response acknowledgement is received. The acknowledgement may guarantee program execution integrity. However, the execution performance of an application is very sensitive to memory access latency, particularly while waiting for an acknowledgment for the write request. The memory access latency may vary between highly coupled systems (e.g., a dynamic random-access memory ("DDR") may achieve a 10 nanosecond ("ns") response delay) and controllers that have to access memory mediums over a network (e.g., a disaggregated memory system may require hundreds of ns).

More specifically, computing applications entirely depend on the computing hardware for memory access integrity. If a memory access request fails, the computing hardware immediately detects the memory access request failure by stalling or triggering a system reboot. As such, there is a need to guarantee program execution integrity and increase execution performance of computing applications that depend heavily on write access performance while reducing the memory access latency. Accordingly, the present invention aims to improve the performance of computing applications that heavily depend on memory write access performance.

In one aspect, a memory controller subsystem may guarantee the in-order delivery of a memory access write request by the CPU using an early write acknowledgement ("EWACK" or "EWACK response"). The CPU does not expect to receive acknowledgements from the memory controller and immediately proceeds with execution after write request data has left the CPU. Depending on the number of write requests issued by a program, an EWACK may increase execution performance by an order of magnitude. When an EWACK operation is used, the responsibility to guarantee that write requests are in fact delivered may be offloaded to the memory controller. Thus, the controller should perform tasks such as, for example, i) buffering request, ii) flow control, iii) implementation of acknowledgement scheme and iv) data integrity checks. However, each of these tasks may introduce significant delays in the critical path which can diminish performance gains down to zero. Thus, the present invention provides an additional mode of operation where responsibilities can be split between hardware and computing application components. This provides an additional added feature and advantage over the current state of the art by enabling computing applications that can tolerate and recover from EWACK related errors to achieve significant performance improvement and significantly reduce memory access latency.

In an additional aspect, the mechanisms of the illustrated embodiments provide for using a memory access broker system with application-controlled EWACK operation support. The memory access broker device may be interleaved between memory bus masters and memory controller slaves. The memory access broker device may be selectively enabled to facilitate early write acknowledgement (EWACK) operations and notification of failed EWACK write requests to one or more issuing applications such that the failed EWACK write requests are logged by the memory access broker for inspection by the one or more issuing applications.

The memory bus request broker system may be a computing hardware and computer application co-designed system. The computing hardware part of the system may be the memory bus request broker and interleaved between each memory bus master and one memory controller slave. The memory bus request broker EWACK function can be automatically enabled or disabled at runtime via a computer application-controlled hardware switch and is controlled by the operating system kernel through a memory mapped register.

In one aspect, various embodiments are provided to guarantee data integrity and deterministic program execution while significantly improving application performance for memory write accesses. In one aspect, a write access request broker device facilitates fast EWACK and notification of failed write requests to issuing applications. The memory write access request broker device can be selectively enabled at runtime to serve applications that have the required support to safely exploit the memory write access request broker device without affecting the execution integrity of concurrently active legacy applications. The present invention provides for an operating system (OS) and application programming interface (API) support for application level control, write access request integrity checks, and barriers for application-level handling of failed writes.

An additional added feature and advantage over the current state of the art is provided by using the memory access broker system within various computing architectures such as, for example, in a disaggregated memory system. For example, in the disaggregated memory system, the memory mediums reside in different physical server trays, are interconnected via low-latency, high-speed interconnects (e.g. optical circuits and switches) to the CPUs and DMAs, and have significantly longer access delays than local memory. While the interconnect can, in theory, be configured to provide lossless communication channels, the devices along the memory access path may unexpectedly fail or stall. Thus, the memory access broker device, as described herein, enables the disaggregated memory system to prevent devices along the memory access path from unexpectedly failing or stalling.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
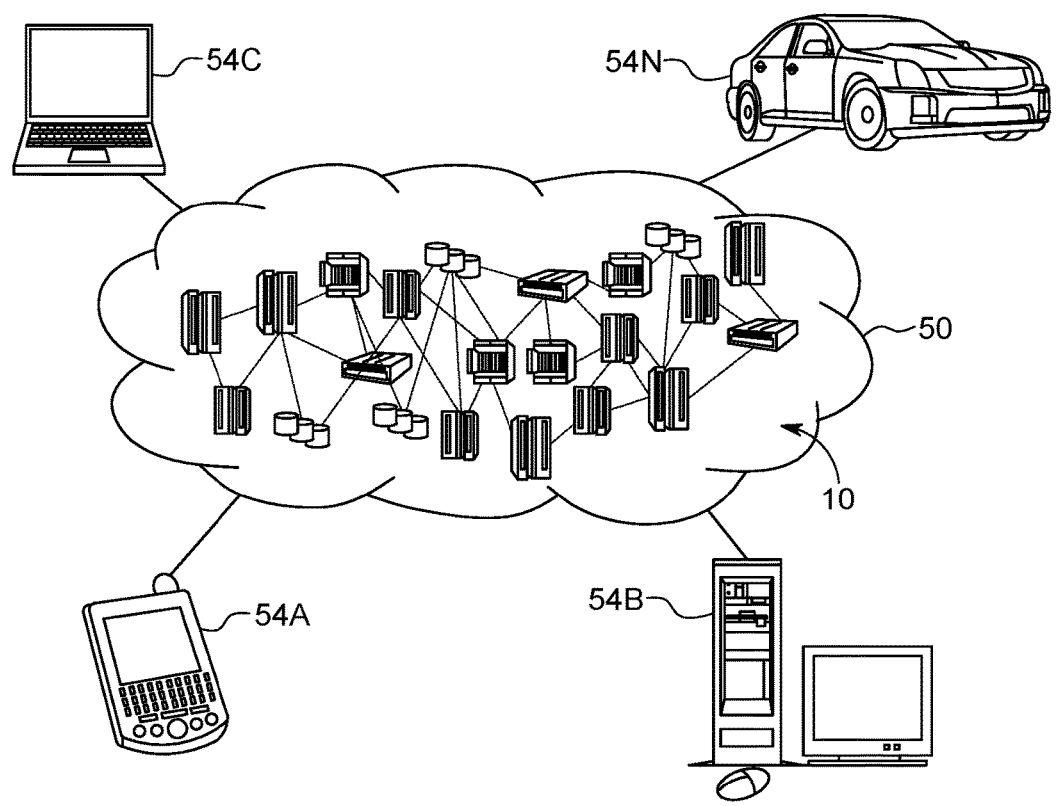
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
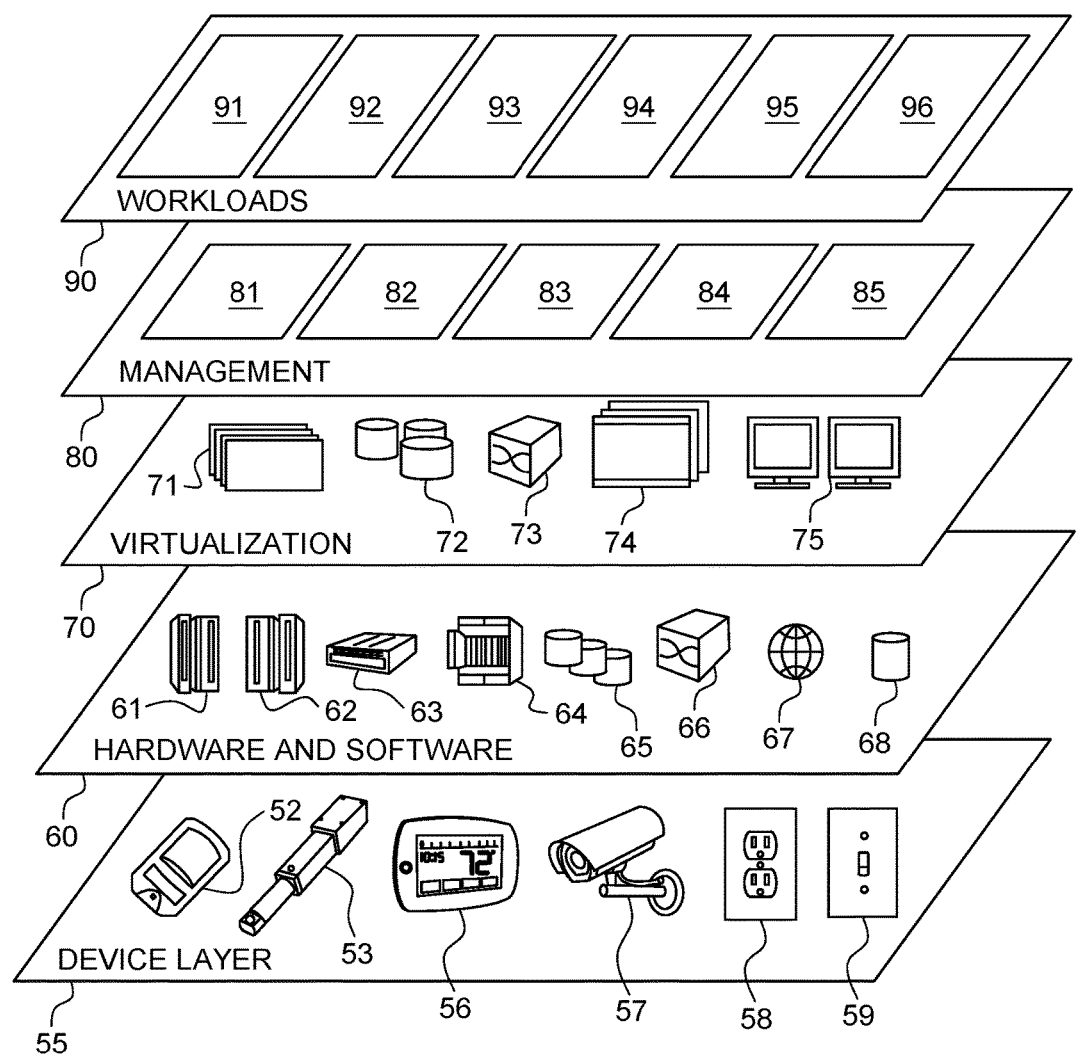
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various memory access broker systems with application-controlled early write acknowledgment workloads and functions 96. In addition, memory access broker systems with application-controlled early write acknowledgment workloads and functions 96 may include such operations as data analysis (including data collection and processing from various environmental sensors) and predictive data analytics functions. One of ordinary skill in the art will appreciate that the memory access broker systems with application-controlled early write acknowledgment workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches to guarantee data integrity and deterministic program execution while significantly improving application performance for memory write accesses. In one aspect, a write access request broker device facilitates fast early write acknowledgement and notification of failed write requests to issuing applications. The memory write access request broker device can be selectively enabled at runtime to serve applications that have the required support to safely exploit the memory write access request broker device without affecting the execution integrity of concurrently active legacy applications. One or more solutions are provided for an operating system (OS) and application programming interface (API) support for application level control, write access request integrity checks, and barriers for application-level handling of failed writes.

These mechanisms include functionality that selectively enables a memory access broker system with application-controlled early write acknowledgment support, again by a processor. A memory access broker may be selectively enabled to facilitate early write acknowledgement (EWACK) operations and notification of failed EWACK write requests to one or more issuing applications such that the failed EWACK write requests are logged by the memory access broker for inspection by the one or more issuing applications.

Figure 4A:
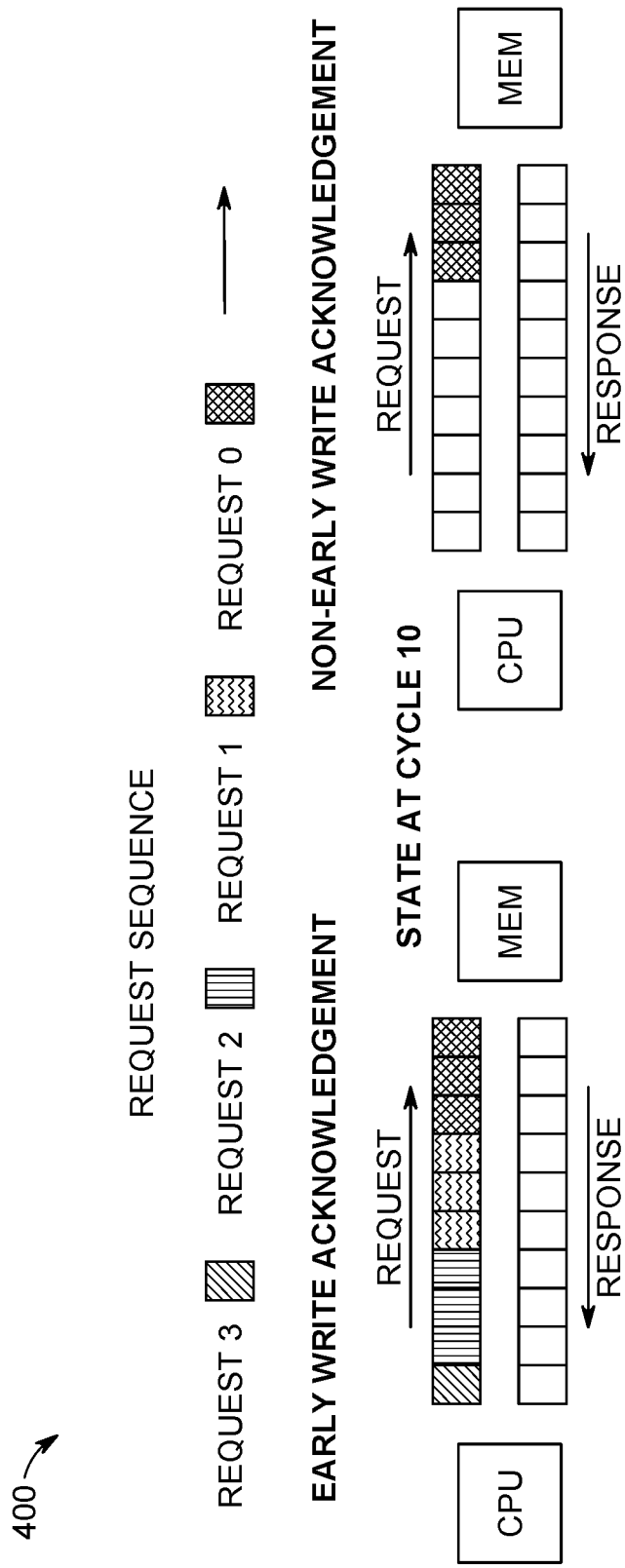
FIGS. 4A-4B are diagrams depicting an early write acknowledgment (EWACK) operation and a non-early write acknowledgment (WACK) operation performance comparison in accordance with aspects of the present invention.
Figure 4B:
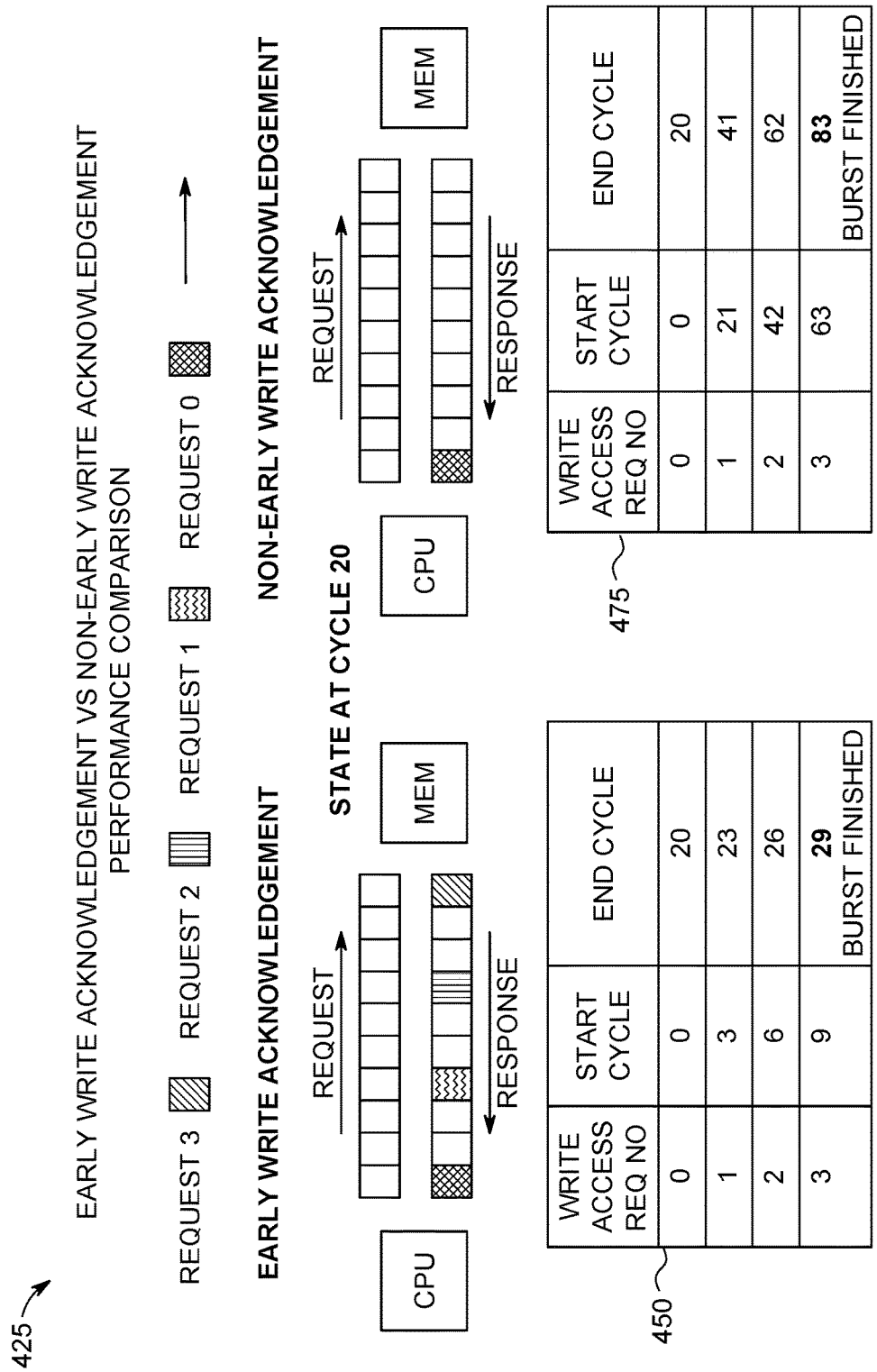

Turning now to FIGS. 4A-4B are diagrams 400, 425 depicting early write acknowledgment (EWACK) and a non-early write acknowledgment (WACK) performance comparison. Consider the following two examples for comparing the EWACK and WACK performance.

For diagrams 400, 425, assume a symmetrical, twenty cycle 64-bit pipeline (e.g., 10 stage requests/10 stage responses) between a CPU and a memory ("mem"). Said differently, the 10 stage write requests are the first 10 cycles and the 10 stage write responses are the second 10 cycles for a total of 20 cycles. Assume also there are four 192-bit write data requests (e.g., responses 0, 1, 2, and 3) sequentially issued for the request sequence. A WACK may be 64-bits. The request pipeline may transfer write data and response pipeline WACKS. Assume also that each write request ("request") requires three cycles (e.g., 192-bit/64-bit) in order to have all data in transit in the pipeline.

Turning now to diagram 400, the differences between the EWACK and the WACK are illustrated for the arrival of the first 64-bits of the first write request (e.g., request 0) to the memory. More specifically, diagram 400 illustrates that for the WACK, only request 0 (e.g., the first 64-bit request) is in transit for the arrival of the first write request to the memory. Only upon return of the write response from the memory for request 0 can the next write request be issued in transit on the pipeline to the memory such as, for example, request 1. This same process continues for each subsequent write request (e.g., requests 2 and 3). In contrast, the EWACK operations eliminate such memory access latency and enable each of the write requests such as, for example, requests 0-3 to be sequentially issued and in transit at the same time in the pipeline.

Turning now to diagram 425 of FIG. 4B, the performance differences between the EWACK and the WACK are depicted when the first request response (e.g., request 0) is issued from the memory and arrives at the CPU. All 64-bit EWACKS (for requests 0-3) are in-transit on the response pipeline for the EWACK. In contrast, at the same cycle for the WACK, both the request pipeline and the response pipeline are empty except for only the first request (e.g., request 0), which is almost complete (e.g., completed 20 cycles).

More specifically, table 450, reflecting the total EWACK response times, shows that for write access request 0, the start cycle begins at 0 and the end cycle completes at 20. For write access request 1, the start cycle begins at 3 and the end cycle completes at 23. For write access request 2, the start cycle begins at 6 and the end cycle completes at 26. For write access request 3, the start cycle begins at 9 and the end cycle completes at 29. That is, the write burst finishes at cycle 29.

Table 475 for the WACK shows that for write access request 0, the start cycle begins at 0 and the end cycle completes at 20. For write access request 1, the start cycle begins at 21 and the end cycle completes at 41. For write access request 2, the start cycle begins at 42 and the end cycle completes at 62. For write access request 3, the start cycle begins at 63 and the end cycle completes at 83. That is, the write burst finishes at cycle 83. As illustrated, the EWACK operations as compared with the WACK, a 54-cycle reduction may be achieved for all total write requests of FIG. 4B.

Using the EWACK operations, the present invention enables EWACK support without requiring the memory controller subsystem to guarantee delivery so as to maximize performance. To support this, the mechanisms of the illustrated embodiments monitor and log write acknowledgement failures out of a critical memory access path and make the logged write acknowledgement failure information available to applications. The responsibility to periodically check for write request errors and take corrective action is transferred to the application-level. Moreover, as another added feature and advantage over the current state of the art, the EWACK function can be selectively enabled only for requests that are related to the execution of applications that can handle the write request access faults thereby allowing legacy applications to execute concurrently and safely, without required modifications.

Figure 5A:
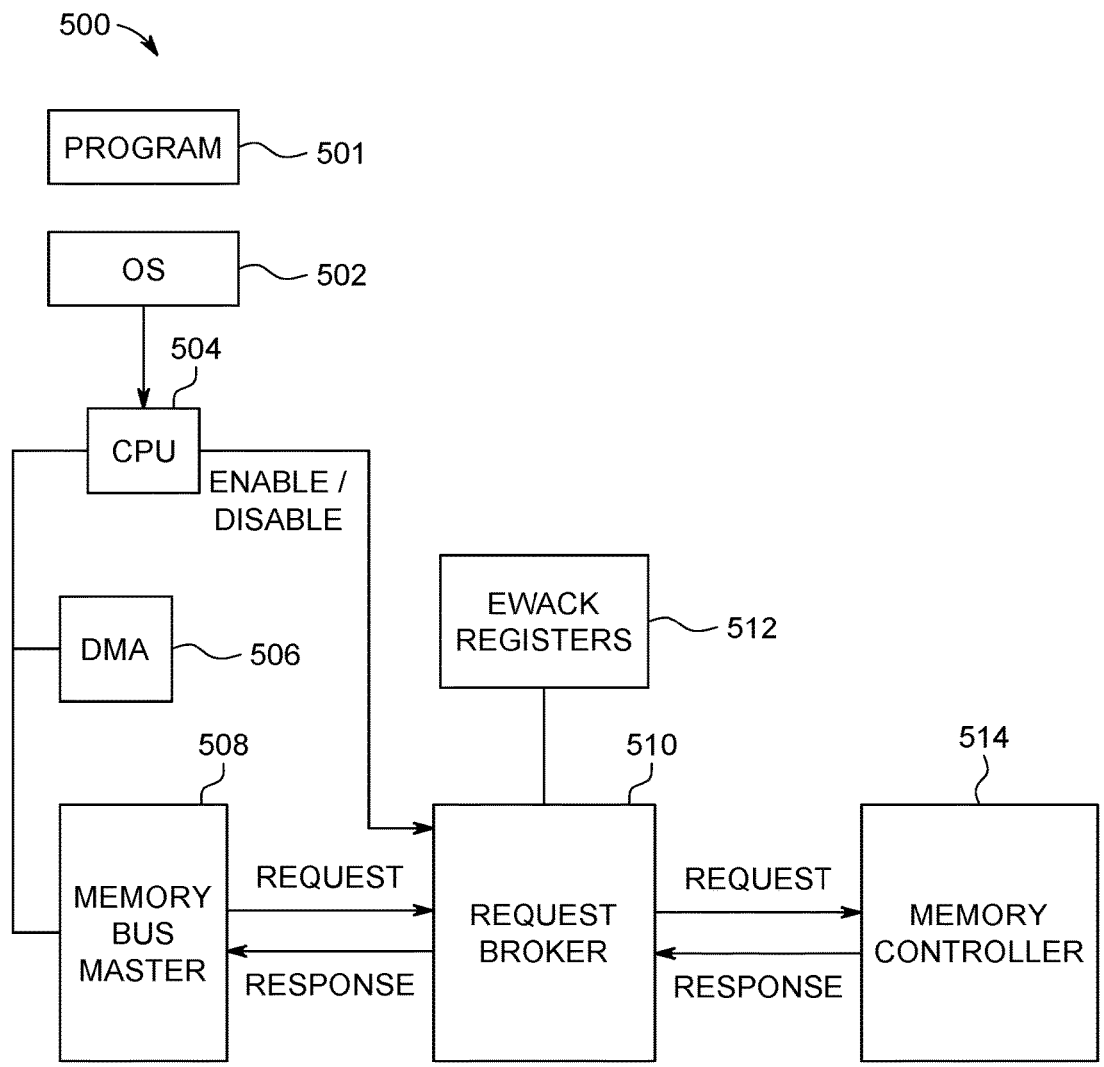
FIGS. 5A-5D are diagrams depicting an exemplary use of a memory access broker system in accordance with aspects of the present invention.

In view of the foregoing, consider now the following examples depicted in FIGS. 5A-5D. As illustrated in FIG. 5A (and also in FIG. 5B-5C), a memory bus request broker system 500 may include a memory bus request broker 510 ("request broker" or "EWACK broker") that may be used in a variety of computing architecture frameworks. The memory bus request broker system 500 may be a computing hardware and computer application co-designed system. In one aspect, a computing system may include the memory bus request broker 510, a program 501 associated with an operating software ("OS") 502, a CPU 504, a DMA 506, a bus such as, for example, a memory bus master 508, a memory controller 514, and one or more EWACK registers 512 that may be coupled to the memory bus request broker 510.

In one aspect, the memory bus request broker 510 may be coupled or interleaved between a memory bus master 508 and a memory controller 514 and may log write request failures in a set of memory mapped registers such as, for example, the EWACK registers 512. The EWACK registers 512 may be independently and safely inspected by the OS 502.

In view of the foregoing, consider the following operation examples of the memory bus request broker system 500. As a preliminary matter, to illustrate the various example embodiments, the memory bus request broker 510 may receive a write request from a memory bus master 508. The memory bus request broker 510 may issue the write request to the memory controller 514. The memory bus request broker 510 may receive a WACK response from the memory controller 514. The memory bus request broker 510 may issue to the memory bus master 508 the WACK response received from the memory controller 514. However, the EWACK function of the memory bus request broker 510 may be automatically enabled or disabled at runtime via the CPU 504 (e.g., a computer application-controlled hardware switch) and may be controlled by a kernel of the OS 502 through the EWACK registers 512.

Figure 5B:
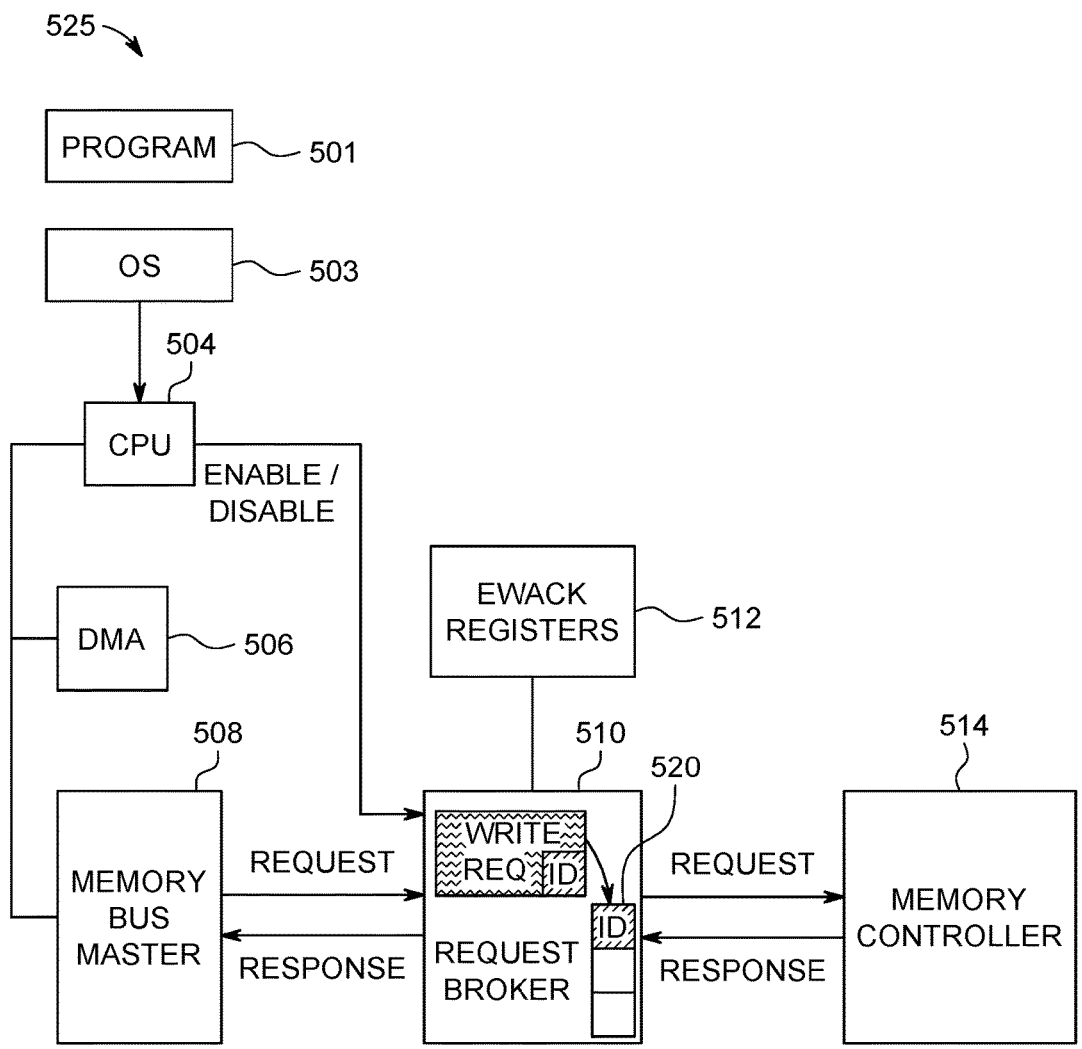

Turning now to FIG. 5B, the memory bus request broker 510 may receive a write request from the memory bus master 508. Upon arrival of the write request, the memory bus request broker 510 may check and determine if the write request should be an EWACK write request or non-EWACK write request. If the write request is an EWACK request, the default request identifier ("ID") that is provided by the memory bus master 508 protocols may be replaced. The replacement ID may be a composite identifier that encodes 1) the CPU or DMA ID that issued the write request, 2) a write request ID and 3) a counter that is internally managed by request broker 510. The first two fields (i.e., the CPU/DMA ID and write request ID) are provided by the memory bus master 508 protocols. That is, both the the CPU/DMA ID and write request ID may be provided by the memory bus protocols (i.e., in the memory request headers). The CPU/DMA ID and write request ID may be combined into one ID that identifies the transaction for the purpose of executing EWACK broker (e.g., memory bus request broker 510) tasks.

The composite ID may be pushed to a queue 520 such as, for example, a first-in-first out ("FIFO") queue 520 towards the response pipeline and may be used as the assigned ID of the outgoing write request. If the write request is determined to not be early acknowledged (e.g., a non-EWACK write request), then the write request is forwarded unaltered and the default ID that was provided from the memory bus master 508 protocols may be used.

Moreover, depending on whether the EWACK mode for the memory bus request broker 510 is enabled or disabled for the write request issuer component such as, for example, the OS 502, the memory bus request broker 510 may either 1) immediately send an EWACK back to the issuer application (e.g., the program 501 associated with the CPU 504) (EWACK mode), or 2) wait and relay the WACK that will be generated by the memory controller 514 after the actual write process is completed. That is, in the EWACK mode 1) the memory bus request broker 510 may immediately respond to the issuing entity (EWACK acknowledgment) without waiting for a controller (e.g., memory controller 514) to acknowledge, and/or 2) the memory bus request broker 510 may not generate an EWACK, but rather allows a controller (e.g., memory controller 514) to respond the normal WACK (e.g., non-EWACK).

The memory controller 514 may send write acknowledgements for all write requests the memory controller 514 receives, particularly, since the memory controller 514 is unaware or oblivious to the operations performed by the memory bus request broker 510.

Figure 5C:
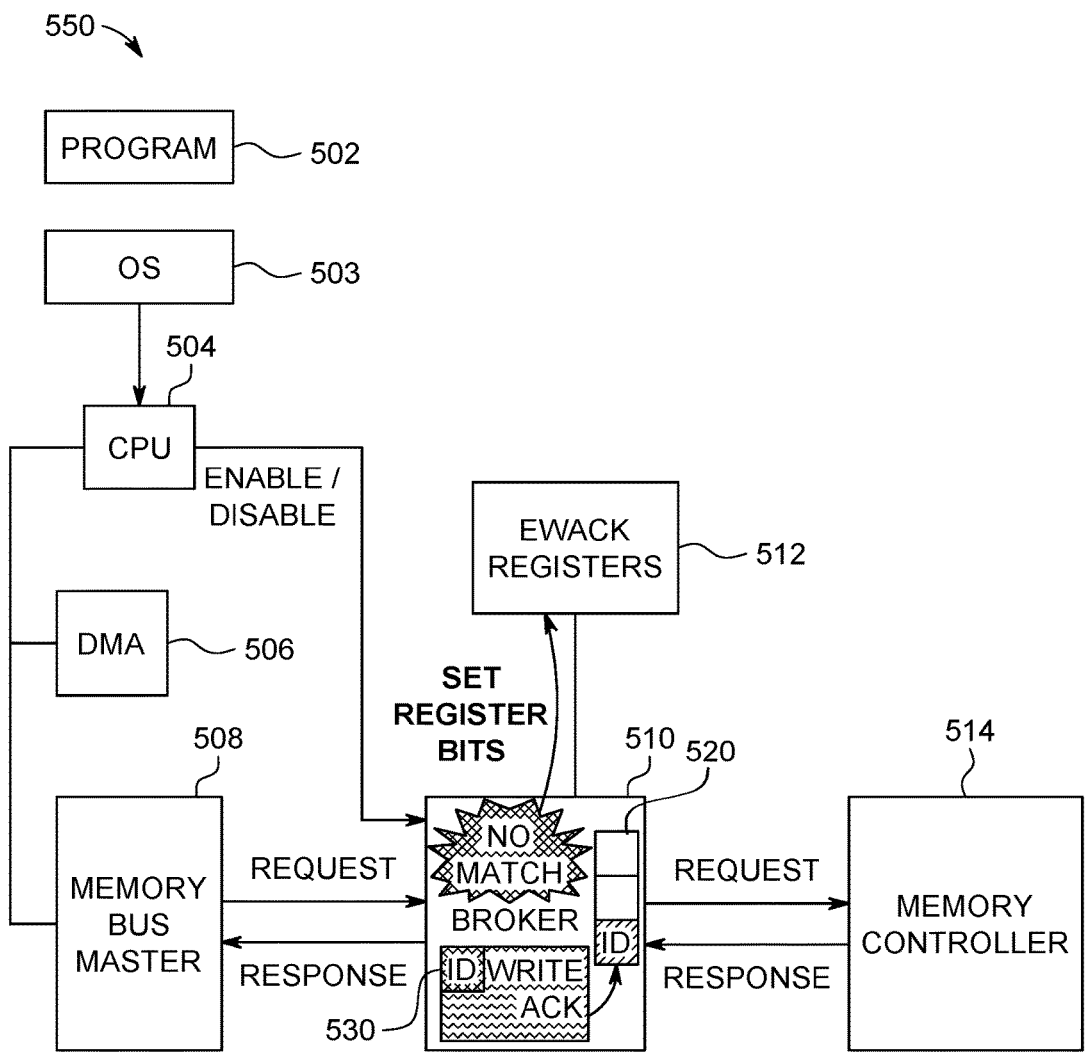

Continuing with the examples illustrated in FIGS. 5A-5B, turning now to FIG. 5C, the memory bus request broker 510 may receive a write acknowledgment (e.g., a WACK response) from the memory controller 514. When the memory bus request broker 510 receives the write acknowledgement 530 from the memory controller 514, the memory bus request broker 510 may retrieve the next composite ID ("ID") from the FIFO queue 520 (e.g., the next composite ID according to the FIFO operations). The memory bus request broker 510 may compare the retrieved composite ID from the FIFO queue 520 with the write acknowledgment 530 (e.g., a WACK response) received from the memory controller 514. For example, when the memory bus request broker 510 issues a request to the memory controller 514 with ID "X", then the memory controller 514 response for that request contains ID X. This enables the memory bus request broker 510 to match request IDs to memory controller response IDs. Because requests are serialized at this level, if a response does not come back, then the respective request ID will fail to match during the FIFO operation so as to identify a failed request.

For the requests that are issued in EWACK mode, if the composite ID that is retrieved from the FIFO queue 520 and the write acknowledgment ID of the write acknowledgment response 530 received from the memory controller 514 match, the memory bus request broker 510 discards the response (since an EWACK has been delivered previously). In non-EWACK mode, the write acknowledgment 530 is forwarded to the memory bus master 508.

On the other hand, in EWACK mode, if the composite ID and the write acknowledgment ID of the write acknowledgment response 530 received from the memory controller 514 do not match according to the comparison operation, the memory bus request broker 510 may log or "set" a designated bit in one or more currently active EWACK registers 512. Since all write requests are replied in-order due to a single memory controller 514, each retrieved composite ID should match the incoming write acknowledgement 530 received from the memory controller 514 unless a previous one is lost. By setting a designated bit in one or more currently active EWACK registers 512, the bit functions as an indication of a failed EWACK write request.

Figure 5D:
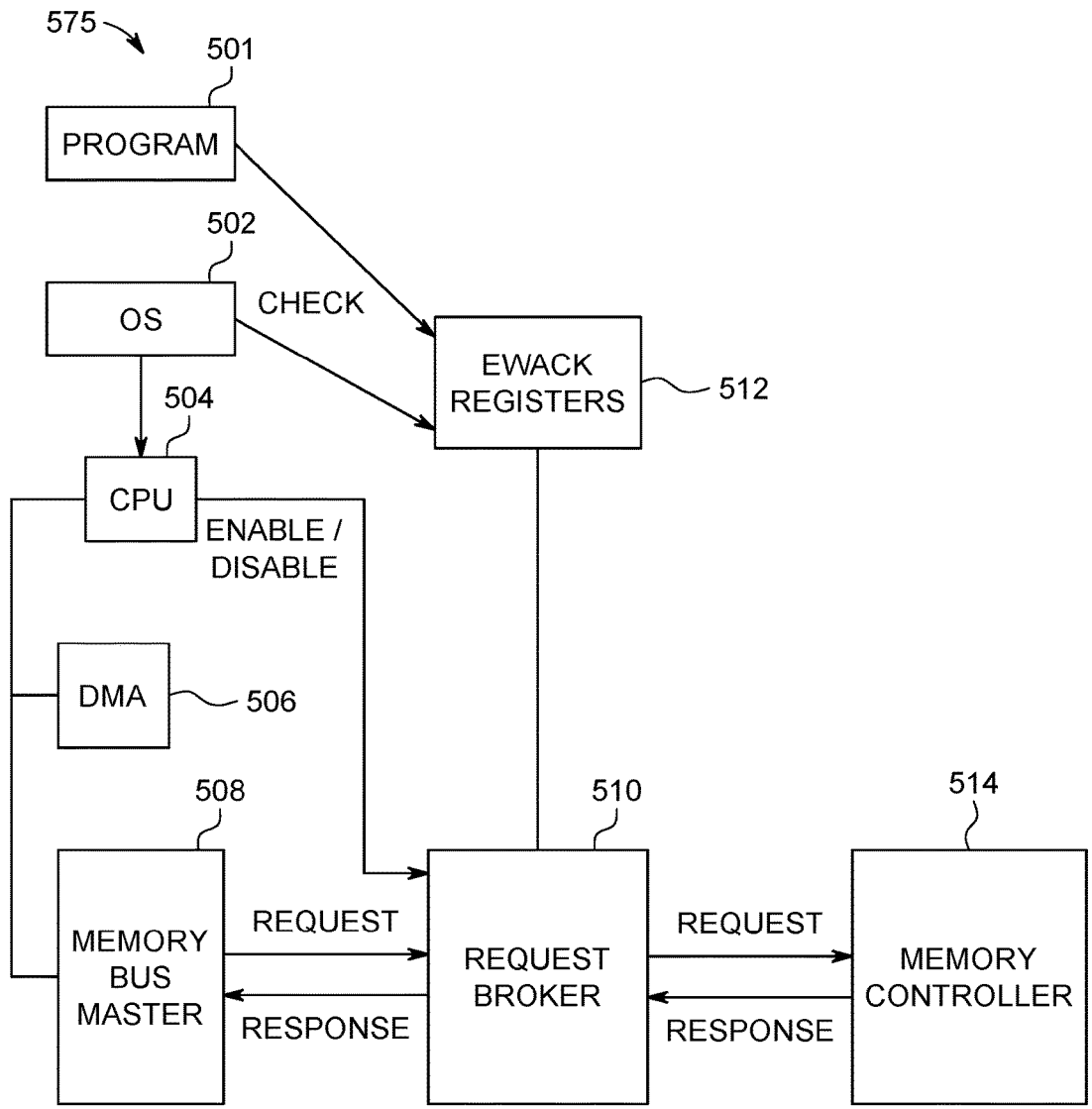

Turning now to FIG. 5D, the memory bus request broker 510 may have set a designated bit in one or more currently active EWACK registers 512 if a failed EWACK write request has been indicated. Accordingly, FIG. 5D indicates that the computing application such as, for example, a program 501 and the associated OS 502, are required to enable/disable the EWACK mode and check the EWACK registers 512 when it is appropriate and safe (i.e., can be safely repeated in case of detected write request failure) for the execution flow. This is because the computing application will proceed with execution before the failed write is detected by the memory bus request broker 510. As such, the computer application is required to check for failed EWACK write requests. That is, application-level support (e.g., a computer application assists the memory bus request broker 510 for detecting, identifying, and responding to failed write requests) is required to appropriately inspect the memory mapped EWACK registers 512 for failed write requests in order to handle and address possible write faults. Moreover, the computer application (e.g., the application-level support) is required to disable the EWACK operation mode in the memory bus request broker 510 for code blocks where write faults cannot be handled. The access latency to the EWACK registers 512 (e.g., memory mapped registers) is extremely low so the EWACK registers 512 can be inspected (frequently or periodically) by the computing application with negligible overhead. Operating system support may also be required to safely enable/disable the EWACK operation mode in the memory bus request broker 510 when an application requests disablement of the EWACK operation and also for protecting EWACK DMA transfers from write faults. Thus, if the issuing applications detect a failed write request in the EWACK registers 512, the issuing applications may be required to reissue each write request upon identifying the failed EWACK write request indicated in the one or more EWACK registers 512.

In one aspect, the application-level support may be comprised of an EWACK OS service registration operation, a service enable/disable operation, and a memory write integrity barrier operation. When a computing application enters processing blocks that can be repeated in case of write access failures, the application-level support service should be enabled and memory integrity barrier checks may be placed in the code. In case a barrier check fails, the computing application may take one or more actions.

In an additional aspect, the operating system-level support makes available the EWACK service on a per OS process basis. For example, each time a process scheduler decides to grant the CPU to a new application, the OS may perform the following checks prior to the actual context switch. The OS may check non-uniform memory access ("NUMA") domain(s) to confirm that the computer application uses EWACK access capable memory and decide which EWACK brokers (since there may be more than one EWACK broker in a computer system) to enable or disable for the particular CPU(s) on which the application is about to execute. The enable command for enabling the EWACK operation may be atomic (single byte memory-mapped write to a broker control register for a current CPU). Upon receiving the enable command for the EWACK operation, the EWACK brokers may block all request traffic and may wait for all in-transit requests to complete before the EWACK broker responds to a write request. After completing all the received in-transit requests, the request traffic may be unblocked. The disable command, for disabling the EWACK operation, does not stall any write request traffic and is immediately applied.

As another added feature and advantage over the current state of the art, user space libraries may be provided to applications to enable use of EWACK operation functionalities. The user space library may be backed up by OS-level EWACK support. As illustrated in the pseudocode example below, one or more potential "ewackmode_enable" and "ewackmode_disable" APIs respectively enable and disable EWACK operation functionality for a current process. It should be noted that an "ewackmode_enable" operation may be a user library operation function and may not directly drive the enablement of the hardware/software switch previously described. The "ewackmode_check" operation may check if there have been any write errors and may reset the EWACK registers for the process. It is up to an application to decide when to use EWACK mode and to decide the granularity of checks. Also, an application may decide what recovery action to execute (in the example, restart a computation).

The pseudocode for one or more potential "ewackmode_enable" and "ewackmode_disable" APIs respectively enable and disable EWACK operation functionality:

```
#include <libewack.h>
void main(void) {
    // EWACK is off
    // prepare input, or do anything.
    // CPU is in normal mode of operation.
    // Enable EWACK mode for the CPU executing
    // the application
    ewackmode_enable( );
    // repeat if errors (rare condition)
    do {
        // this will go fast thanks to EWACK mode
```

```
        some_memory_intensive_computation( );
    } while (ewackmode_check( ));
    ewackmode_disable( );
    // possibly do more things
    return;
    }
```

As another added feature and advantage over the current state of the art, DMA transfers may each be executed in EWACK mode with OS support as follows. DMA engines may be programmed by device drivers using operating system libraries. Before initiating a DMA transfer, the OS may check the destination NUMA region and decide to enable EWACK on the respective EWACK broker for that DMA ID. When a DMA transfer is complete and a done interrupt is issued, the OS, in the context of the done interrupt handler and before passing the control back to the application, may check or inspect the respective EWACK broker EWACK registers that were assigned to this DMA transfer. In case of reported errors (e.g., failed write requests) the programmed transfer may be repeated instead of passing control to the application that issued the DMA transfer. If there are no reported errors, execution may proceed as normal in the computing system. Each OS process and device driver (for DMA) may be assigned a unique EWACK register during registration and may be active for updates when the process is executed.

Figure 6:
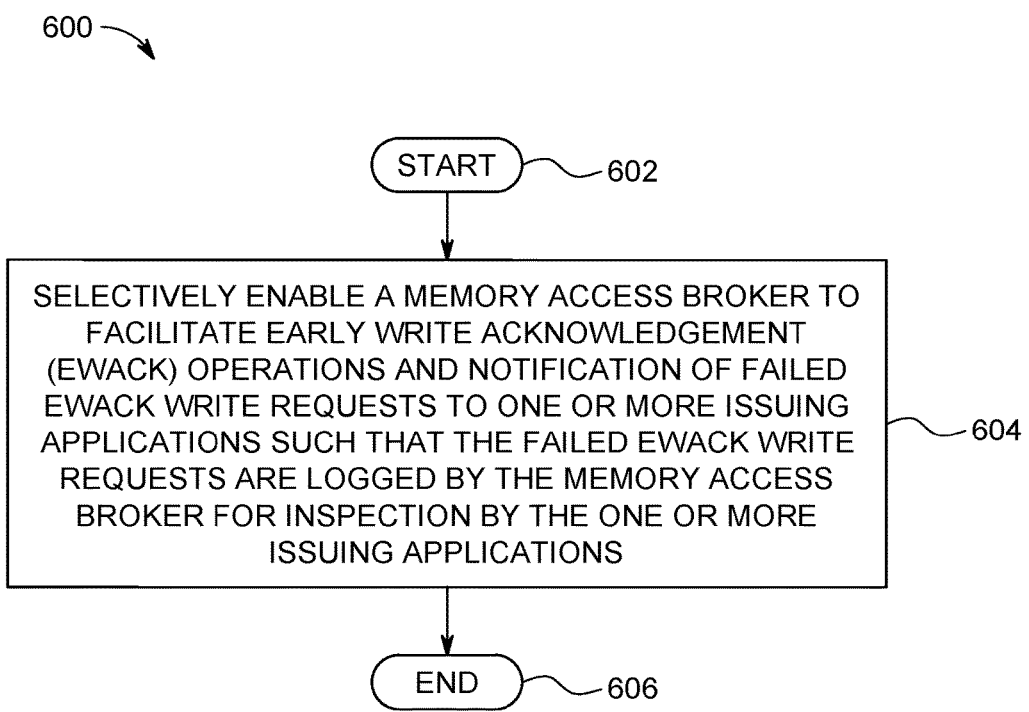
FIG. 6 is a flowchart diagram depicting an additional exemplary method for using a memory access broker system with application-controlled early write acknowledgment support in which aspects of the present invention may be realized.

Turning now to FIG. 6, a method 600 for using a memory access broker system with application-controlled early write acknowledgment support is depicted, in which various aspects of the illustrated embodiments may be implemented. That is, FIG. 6 is a flowchart of an additional example method 600 for using a memory access broker system with application-controlled early write acknowledgment support in a computing environment according to an example of the present invention. The functionality 600 may be implemented as a method executed as instructions on a machine, where the instructions are included on at least one computer readable storage medium or one non-transitory machine-readable storage medium. The functionality 600 may start in block 602. A memory access broker may be selectively enabled to facilitate early write acknowledgement (EWACK) operations and notification of failed EWACK write requests to one or more issuing applications such that the failed EWACK write requests are logged by the memory access broker for inspection by the one or more issuing applications, as in block 604. The functionality 600 may end in block 606.

In one aspect, in conjunction with and/or as part of at least one block of FIG. 6, the operation of 600 may include one or more of each of the following. The operation of 600 may selectively enable or disable the memory access broker at runtime of a write request. The memory access broker may serve as an intermediary broker between a memory bus master and a memory controller. The operation of 600 may log the failed write requests in one or more EWACK registers (e.g., set a bit in a register indicating a failed write request) associated with the memory access broker. The operation of 600 may receive, by the memory access broker, a write request from a memory bus master, or issuing, by the memory access broker, to a memory controller the write request received from the memory bus master.

In an additional aspect, the operation of 600 may receive, by the memory access broker, a WACK response from the memory controller; or issue, by the memory access broker, to the memory bus master the WACK response received from the memory controller. The memory access broker may also generate a write request identifier (ID) for each EWACK write request and place in the generated write request ID in a queue.

The operation of 600 may compare, by the memory access broker, a WACK response received from a memory controller with the generated write request ID retrieved from the queue. The operation of 600 may indicate a failed EWACK write request in one or more EWACK registers by the memory access broker upon determining the generated write request ID retrieved from the queue does not match the WACK response received from the memory controller, and identify the failed EWACK write request logged in the one or more EWACK registers by the one or more issuing applications. Additionally, the operation of 600 may require the one or more issuing applications to reissue each write request upon identifying the failed EWACK write request indicated in the one or more EWACK registers.

Thus, as described herein, the present invention provides a memory access broker system that guarantees data integrity and deterministic program execution, while significantly improving application performance for memory write accesses. The memory access broker system may include a hardware memory write access request broker that facilitates fast EWACK and notification of failed write requests to issuing applications. The memory access broker system can be selectively enabled at runtime to serve applications that have the required support to exploit it safely, without affecting the execution integrity of concurrently active legacy applications. The memory access broker system comprises an operating system and application programming interface support for application level control, write integrity checks, and barriers for application-level handling of failed writes.

In this way, the present invention provides added feature and advantage over the current state of the art by effectively enabling, from a performance perspective, the use of remote memory in a variety of computing systems and architectures such as, for example, cloud and data-centric systems. More specifically, the memory access broker with application-controlled early write acknowledgment support may be implemented in and used with disaggregated memory (e.g., "extended memory"). Thus, without the memory access broker system, memory writes will continue to be of prohibitively high latency, thus diminishing the return and value of remote or extended memory.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for using a memory access broker for early write acknowledgement support, comprising:
    selectively enabling a memory access broker to facilitate early write acknowledgement (EWACK) operations and notification of failed EWACK write requests to one or more issuing applications such that the failed EWACK write requests are logged by the memory access broker for inspection by the one or more issuing applications;
    generating, by the memory access broker, a write request identifier (ID) for each EWACK write request;
    placing the generated write request ID in a queue;
    comparing, by the memory access broker, a write acknowledgement (WACK) response received from a memory controller with the generated write request ID retrieved from the queue;
    indicating a failed EWACK write request in one or more EWACK registers by the memory access broker upon determining the generated write request ID retrieved from the queue does not match the WACK response received from the memory controller; and
    identifying the failed EWACK write request logged in the one or more EWACK registers by the one or more issuing applications.

2. The method of claim 1, further including selectively enabling or disabling the memory access broker at runtime of a write request, wherein the memory access broker serves as an intermediary broker between a memory bus master and a memory controller.

3. The method of claim 1, further including logging the failed write requests in one or more EWACK registers associated with the memory access broker.

4. The method of claim 1, further including;
receiving, by the memory access broker, a write request from a memory bus master; and
issuing, by the memory access broker, to a memory controller the write request received from the memory bus master.

5. The method of claim 1, further including;
receiving, by the memory access broker, the WACK response from the memory controller; or
issuing, by the memory access broker, to the memory bus master the WACK response received from the memory controller.

6. The method of claim 1, further including requiring the one or more issuing applications to reissue each write request upon identifying the failed EWACK write request indicated in the one or more EWACK registers.

7. A system for using a memory access broker for early write acknowledgement support, comprising:
one or more computers with executable instructions that when executed cause the system to;
selectively enable a memory access broker to facilitate early write acknowledgement (EWACK) operations and notification of failed EWACK write requests to one or more issuing applications such that the failed EWACK write requests are logged by the memory access broker for inspection by the one or more issuing applications,
generate, by the memory access broker, a write request identifier (ID) for each EWACK write request;
place the generated write request ID in a queue;
compare, by the memory access broker, a write acknowledgement (WACK) response received from a memory controller with the generated write request ID retrieved from the queue;
indicate a failed EWACK write request in one or more EWACK registers by the memory access broker upon determining the generated write request ID retrieved from the queue does not match the WACK response received from the memory controller; and
identify the failed EWACK write request logged in the one or more EWACK registers by the one or more issuing applications.

8. The system of claim 7, wherein the executable instructions selectively enable or disable the memory access broker at runtime of a write request, wherein the memory access broker serves as an intermediary broker between a memory bus master and a memory controller.

9. The system of claim 7, wherein the executable instructions log the failed write requests in one or more EWACK registers associated with the memory access broker.

10. The system of claim 7, wherein the executable instructions;
receive, by the memory access broker, a write request from a memory bus master; and
issue, by the memory access broker, to a memory controller the write request received from the memory bus master.

11. The system of claim 7, wherein the executable instructions;
receive, by the memory access broker, the WACK response from the memory controller; or
issue, by the memory access broker, to the memory bus master the WACK response received from the memory controller.

12. The system of claim 7, wherein the executable instructions
require the one or more issuing applications to reissue each write request upon identifying the failed EWACK write request indicated in the one or more EWACK registers.

13. A computer program product for, by a processor, discovery and analysis of interpersonal relationships from unstructured text data, the computer program product comprising a non-transitory computer-readable storage medium having computer-readable program code portions stored therein, the computer-readable program code portions comprising:
an executable portion that selectively enables a memory access broker to facilitate early write acknowledgement (EWACK) operations and notification of failed EWACK write requests to one or more issuing applications such that the failed EWACK write requests are logged by the memory access broker for inspection by the one or more issuing applications;
an executable portion that generates, by the memory access broker, a write request identifier (ID) for each EWACK write request;
an executable portion that places the generated write request ID in a queue;
an executable portion that compares, by the memory access broker, a write acknowledgement (WACK) response received from a memory controller with the generated write request ID retrieved from the queue;
an executable portion that indicates a failed EWACK write request in one or more EWACK registers by the memory access broker upon determining the generated write request ID retrieved from the queue does not match the WACK response received from the memory controller; and
an executable portion that identifies the failed EWACK write request logged in the one or more EWACK registers by the one or more issuing applications.

14. The computer program product of claim 13, further including an executable portion that selectively enables or disables the memory access broker at runtime of a write request, wherein the memory access broker serves as an intermediary broker between a memory bus master and a memory controller.

15. The computer program product of claim 13 further including an executable portion that logs the failed write requests in one or more EWACK registers associated with the memory access broker.

16. The computer program product of claim 13, further including an executable portion that;
receives, by the memory access broker, a write request from a memory bus master;
issues, by the memory access broker, to a memory controller the write request received from the memory bus master;
receives, by the memory access broker, the WACK response from the memory controller; or
issues, by the memory access broker, to the memory bus master the WACK response received from the memory controller.

17. The computer program product of claim 13, further including an executable portion that requires the one or more issuing applications to reissue each write request upon identifying the failed EWACK write request indicated in the one or more EWACK registers.

\* \* \* \* \*